United States Patent
Cho et al.

(10) Patent No.: US 6,178,153 B1
(45) Date of Patent: *Jan. 23, 2001

(54) COMPACT DISK AUTO-EXCHANGER AND METHOD THEREOF

(75) Inventors: Chan-Kyoung Cho, Seoul; Seung-Hyuk Shin, Kyonggi-do; Young-Beom Choi, Seoul, all of (KR)

(73) Assignee: Hyundai Electronics Ind. Co., Ltd., Kyonggi-do (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/786,308

(22) Filed: Jan. 22, 1997

Related U.S. Application Data (63) Continuation-in-part of application No. 08/393,133, filed on Feb. 21, 1995, now abandoned.

(30) Foreign Application Priority Data

Feb. 18, 1994 (KR) .................................................. 94-2858

(51) Int. Cl.⁷ .................................................. G11B 17/22
(52) U.S. Cl. ............................................. 369/192; 369/36
(58) Field of Search .................................. 369/34, 36, 38, 369/39, 178, 179, 191, 192; 360/98.04, 98.06, 99.06, 99.07

(56) References Cited

U.S. PATENT DOCUMENTS

| | | |
|---|---|---|
| 2,610,858 | 9/1952 | Kenney ................................. 369/192 |
| 3,976,301 | 8/1976 | Corbett et al. ......................... 369/36 |
| 4,614,474 | 9/1986 | Sudo ..................................... 369/192 |
| 4,701,899 | 10/1987 | d'Alayer de Costemor d'Arc ............... 369/36 |
| 5,150,341 | 9/1992 | Shibayama ............................. 369/36 |
| 5,274,620 | 12/1993 | Sipos ................................... 369/77.2 |
| 5,289,441 | 2/1994 | Domberg et al. ....................... 369/34 |
| 5,335,218 | 8/1994 | Osada .................................. 369/178 |
| 5,414,679 | 5/1995 | Menke .................................. 369/36 |
| 5,431,520 | 7/1995 | Brugger ................................ 369/36 |

FOREIGN PATENT DOCUMENTS 6-28762  2/1994  (JP) .

*Primary Examiner*—David L. Ometz
(74) *Attorney, Agent, or Firm*—Lawrence G. Kurland, Esq.; Brian Cave LLP (57) ABSTRACT

A compact disk auto-exchanger and a method thereof which are capable of more rapidly and accurately moving a compact disk arranged in a magazine to a compact disk player, and loading/unloading the compact disk arranged in a compact disk mechanism into/from the magazine within a limited space. The auto-exchanger includes a transfer member having push levers disposed in each front portion of the magazines for unloading the compact disk in a predetermined direction and an arm disposed between the push levers for loading the compact disk into a predetermined room, with the arm being movable in the left and right directions, a driving apparatus disposed in a bracket of the transfer member for generating a normal and reverse direction force and for transferring the compact disk to a predetermined position, a slider having a carrier main body which is moved by the driving force from the driving apparatus in a state that a guide rail which is horizontally moved in the transfer member is inserted, and a pressing portion which is contacted with a protrusion of the push levers and a timing belt when the horizontal movement is finished wherein the idler gear selectively supports the circumferential surface of the compact disk, and a guide portion having a circular portion in which the slider is rotated in a slanted state so that the free arm member moves the compact disk.

8 Claims, 9 Drawing Sheets

COMPACT DISK AUTO-EXCHANGER AND METHOD THEREOF

This application is a continuation-in-part of our earlier filed copending United States patent application entitled "Compact Disc Auto-Exchanger and Method Thereof" filed Feb. 21, 1995, and bearing Ser. No. 08/393,133 now abandoned.

BACKGROUND OF THE INVENTION

1. Field of the Invention

The present invention relates to a compact disk auto-exchanger and a method thereof, and in particular to an improved compact disk auto-exchanger and a method thereof which is capable of more rapidly and accurately moving a compact disk from a magazine to a compact disk player, and loading/unloading the compact disk arranged in a compact disk mechanism into/from the magazine within a limited space.

2. Description of the Prior Art

Generally, a data writing medium such as a compact disk is formed based on a predetermined standard. Since the amount of data which is able to be written into the compact disk is limited, it is impossible to write a large amount of data into the limited writing area of the compact disk. Therefore, a predetermined number of compact disks are needed for writing a large amount of data thereinto. The thusly arranged compact disks are selectively used one by one, and the exchange of the compact disks is manually performed, thus causing inconvenience.

In addition, the exchange of the compact disks must be manually performed, thus causing inconvenience. Furthermore, the manual exchange of the compact disks needs longer time. The more the number of the compact disks, the more inconvenience incurred.

The conventional compact disk auto-exchanger, which are disclosed by Victor and Sony, includes a magazine having a plurality of stacked storage rooms, into which the compact disks are inserted, formed in an upper space of a reproduction driving mechanism of the compact disk auto-exchanger, with a moving member having a stroke from the uppermost of the magazine to the upper surface of the driving mechanism. This moving member serves to push the compact disk from the magazine and the reproduction driving mechanism. An arm is provided for pushing the compact disk from the magazine and the reproduction driving mechanism, and the compact disks are selectively exchanged, thus providing a user with a large amount of data.

A tray of the auto-exchanging Victor mechanism includes a plurality of storage rooms formed in the magazine for loading and unloading the compact disks thereinto/therefrom. In addition, a carrier which is moved between the reproduction driving mechanism and the uppermost portion of the magazine unloads the tray of the magazine having the compact disk from the storage rooms, and the compact disk contacts with the carrier by a magnetic force. In the above-described state, the tray is loaded into the storage room, and the carrier having the compact disk is moved to the upper surface of the reproduction driving mechanism. In the above-described state, the tray is unloaded from the reproduction driving mechanism, and the tray is returned to the reproduction driving mechanism, thus reproducing data written on the compact disk. After the data is reproduced, the compact disk is unloaded from the tray and is inserted into the tray of the magazine.

However, as the tray arranged in the magazine and the reproduction driving mechanism is loaded/unloaded, the driving process is complicated. In addition, it is impossible to accurately control the operation of the system. Since the operation time of the auto-exchanger becomes longer, it is impossible to rapidly exchange the compact disks.

Furthermore, since the mechanism is complicated, the assembling process is complicated, thus causing malfunction and erroneous operation of the system. In addition, productivity is decreased.

Figure 1:
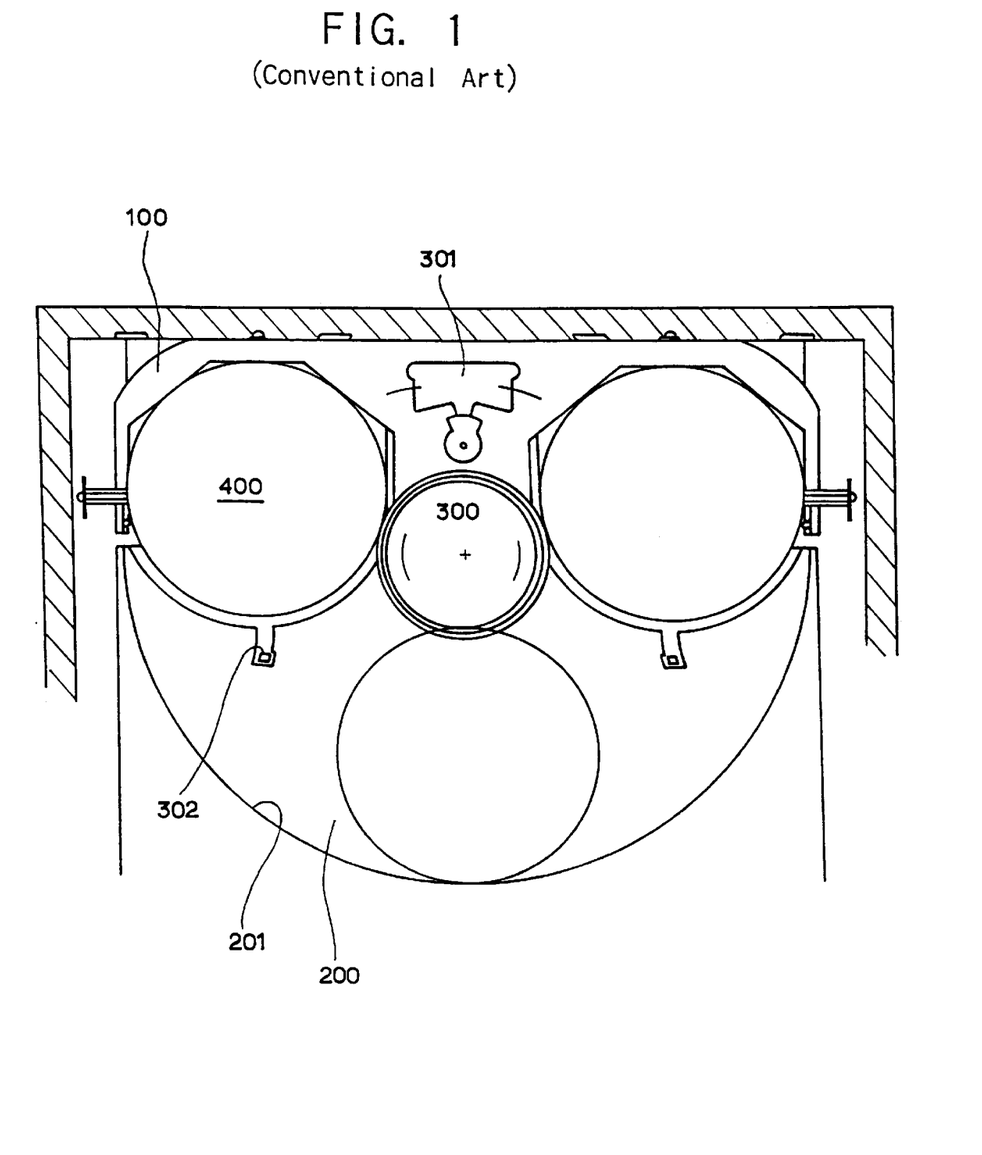
FIG. 1 is a plan view illustrating a conventional prior art compact disk auto-exchanger.

In addition, in the Sony mechanism, as shown in FIG. 1, a compact disk 400 loaded into a storage room of a magazine 100 installed in an upper space of the reproduction driving mechanism is pushed by a push lever 301 disposed in a carrier 200 which moves the uppermost portion of the magazine and the upper surface of the reproduction driving mechanism, and a circular roller 300 is rotated, the compact disk is moved with respect to the carrier, and the carrier is vertically moved to the position of the reproduction driving mechanism. Another push lever 302 of the carrier pushes the compact disk to the center portion of the reproduction driving mechanism, thus reproducing the data written on the compact disk. When the reproducing is finished, the compact disk is moved into the magazine.

However, the push levers 301 and 302 and the roller 300 in the carrier 200 are normally and reversely rotated, and the compact disk positioned at both sides of the carrier 200 and in the reproduction driving mechanism are moved in a predetermined direction. Therefore, the above-described mechanism is complicated, and it is difficult to assemble the system.

SUMMARY OF THE INVENTION

Accordingly, it is an object of the present invention to provide a compact disk auto-exchanger and a method thereof which overcomes the aforementioned problems encountered in the prior art.

It is another object of the present invention to provide an improved compact disk auto-exchanger and a method thereof which are capable of more rapidly and accurately moving a compact disk from a magazine to a compact disk player, and loading/unloading the compact disk arranged in a compact disk mechanism into/from the magazine within a limited space.

To achieve the above objects, there is provided a compact disk auto-exchanger which includes a transfer member having push levers disposed in each front portion of the magazines for unloading the compact disk in a predetermined direction and an arm disposed between the push levers for loading the compact disk into a predetermined room, with the arm being movable in the left and right directions, a driving apparatus disposed in a bracket of the transfer member for generating a normal and reverse direction force and for transferring the compact disk to a predetermined position, a slider having a carrier main body which is moved by the driving force from the driving apparatus in a state that a guide rail which is horizontally moved in the transfer member is inserted, a pressing member which is contacted with a protrusion of the push levers and a timing belt when the horizontal movement is finished wherein the idler gear selectively supports the circumferential surface of the compact disk, and a guide portion having a circular portion in which the slider is rotated in a slanted state so that the free arm member moves the compact disk.

To achieve the above objects, there is provided a compact disk auto-exchanging method which includes the steps of a vertical movement step for vertically moving a transfer member which is vertically moved by a separate driving source and is disposed between a magazine having a plurality of symmetrical storage rooms and a reproduction driving mechanism disposed in a lower portion, an unloading step for returning to the circumferential surface of the compact disk by a contact with a pressing member as a push lever is horizontally moved at both ends of the transfer member and a torsion spring so as to unload the compact disk toward the transfer member, a horizontal movement step in which the slider having a free arm member is moved toward the push lever when a driving force from the driving apparatus fixed to the transfer member which is moved in a predetermined direction in accordance with a control signal is selected as a reverse rotation, and a fixing releasing step in which the slider is horizontally moved toward the magazine or the reproduction driving mechanism, the free arm member of the slider contacting with the guide portion of the transfer member being rotated from the horizontal state to a slanted state, and the idler roller escaping from the compact disk and contacting with the circumferential surface of the compact disk in a horizontal state by the unloading of the compact disk and the returning of the slider.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limiting of the present invention, and wherein:

FIGS. 4A through 4D are cross-sectional views of FIG. 3, of which:

DETAILED DESCRIPTION OF THE INVENTION

Figure 2:
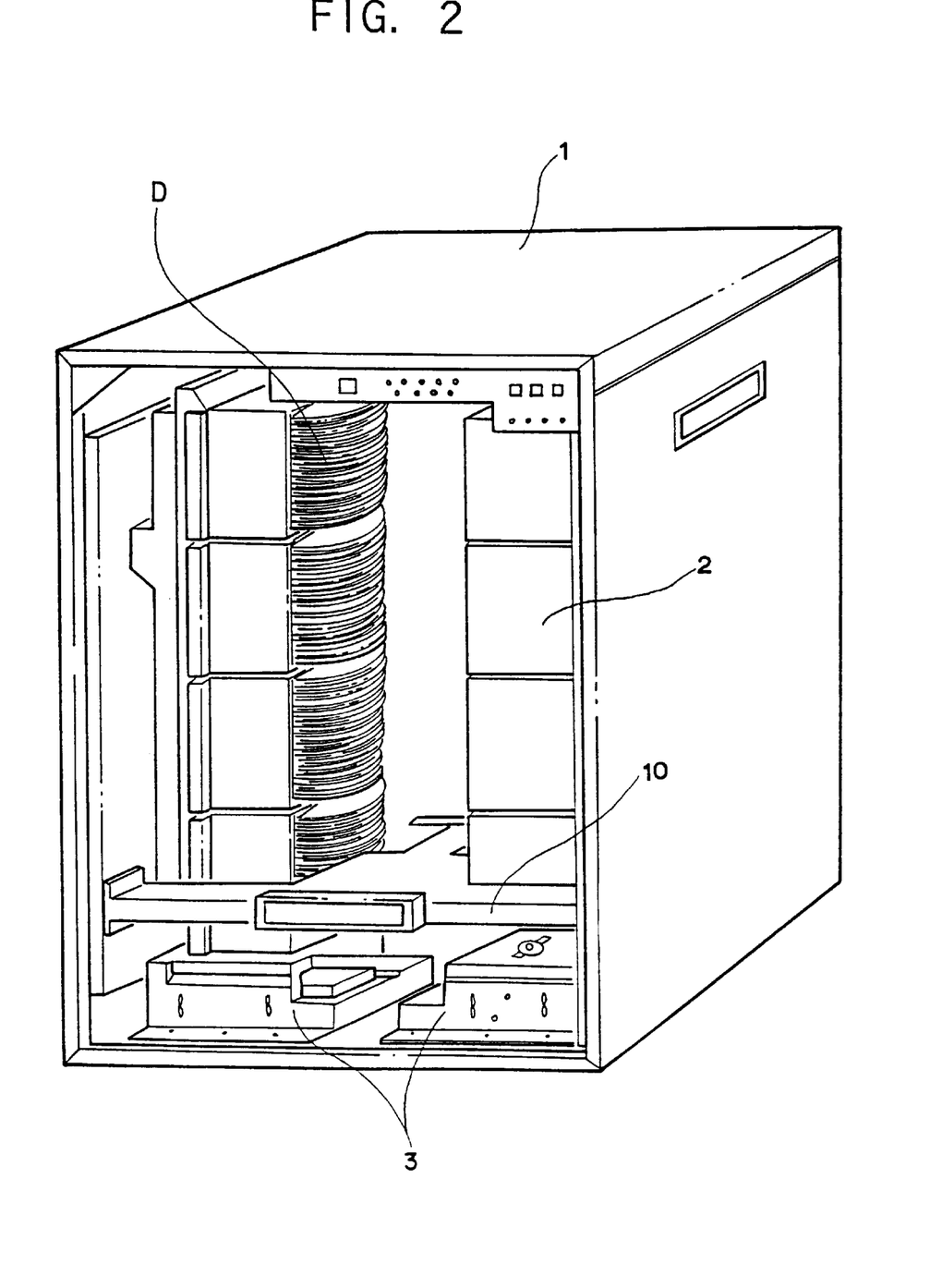
FIG. 2 is a perspective view illustrating a compact disk auto-exchanger according to the present invention.

FIG. 2 is a perspective view illustrating a compact disk auto-exchanger according to the present invention.

As shown therein, four compact disk storage magazines 2 which are capable of storing 45 compact disks are vertically disposed. Four magazines are vertically disposed beside the four compact disk storage magazines 2 in a housing 1. Totally, 360 compact disks are stored in the housing 1.

A reproduction driving apparatus 3 is disposed below each magazine for driving the compact disk and reproducing the data written on the compact disk. A carrier main body 11 moves the compact disk D stored in the magazine to the reproduction driving apparatus and is lowered down to the lower portion from the uppermost portion of the magazine to the reproduction driving apparatus.

Figure 3:
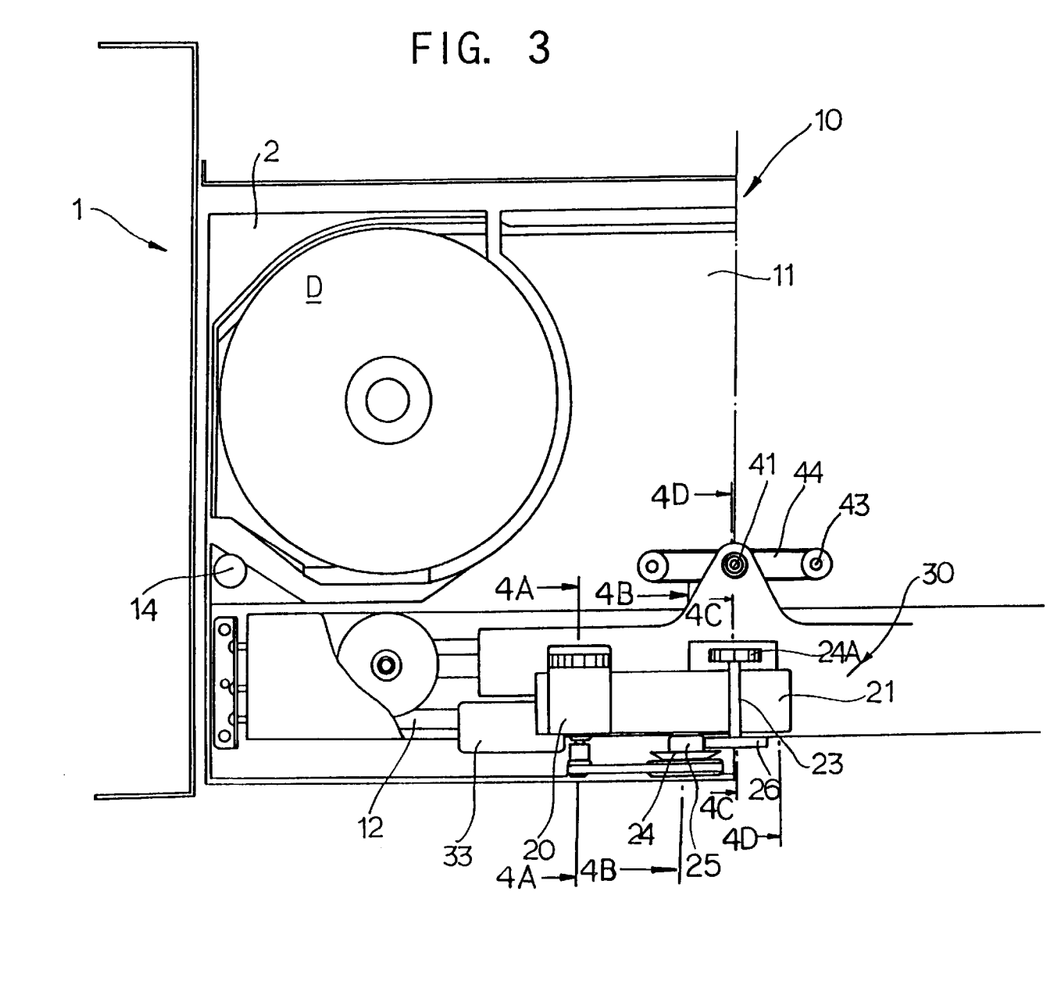
FIG. 3 is a plan view illustrating a magazine and a transfer member of a compact disk auto-exchanger.

FIG. 3 is a plan view illustrating a magazine and a transfer member of a compact disk auto-exchanger.

The magazines are symmetrically disposed in the housing 1. In addition, a transfer member 10 is also symmetrically disposed therein.

The housing includes the magazines 2 which are capable of storing 360 compact disks, a transfer member 10 for moving the compact disk in a state that the compact disk is placed in a space between the magazines, a carrier main body 11 having an area for moving the compact disk, push levers 14 for pushing the compact disk positioned in the magazine and the reproduction driving apparatus, a driving apparatus 20 disposed between the push levers 14 for generating a driving force in accordance with an electric signal, a slider 30 having a free arm 40 which is movable in the left and right directions in the transfer member by the driving force from the driving apparatus, and a guide rail 12 for horizontally moving the slider.

FIGS. 4A through 4D are cross-sectional views of FIG. 3.

A bracket 21 is disposed on the upper portion of the transfer member 10. The bracket 21 includes the driving apparatus 20 having a pulley 22 for normally or reversely rotating a driving shaft, a driving gear assembly 23 having large and small gears for decreasing the driving force from the driving apparatus 20, and a driven gear assembly 24 having large and small gears for increasing the driving force. The driven gear assembly is intermeshed with a rack 32 formed in the upper surface of the slider 30 of the transfer member.

Figure 4A:
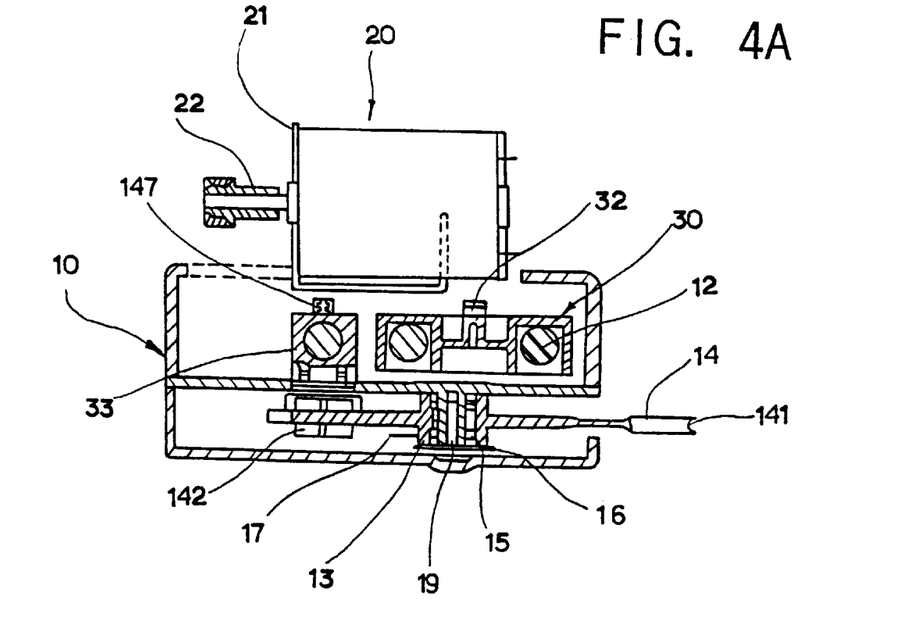
FIG. 4A is a cross-sectional view taken along line A—A of FIG. 3.

FIG. 4A is a cross-sectional view taken along line A—A of FIG. 3. As shown therein, the driving apparatus 20 is fixed to the bracket 21 of the transfer member.

Figure 4B:
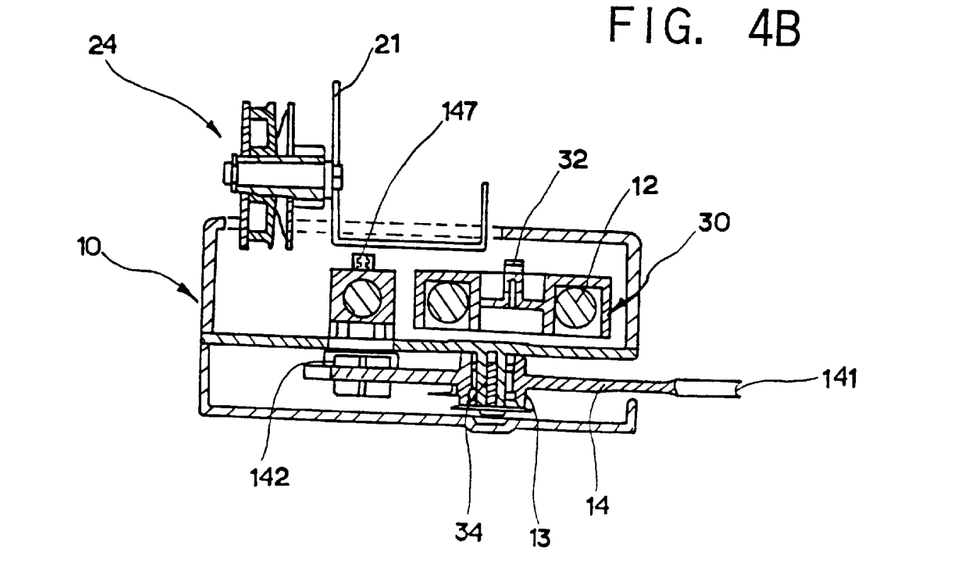
FIG. 4B is a cross-sectional view taken along line B—B of FIG. 3.
Figure 4C:
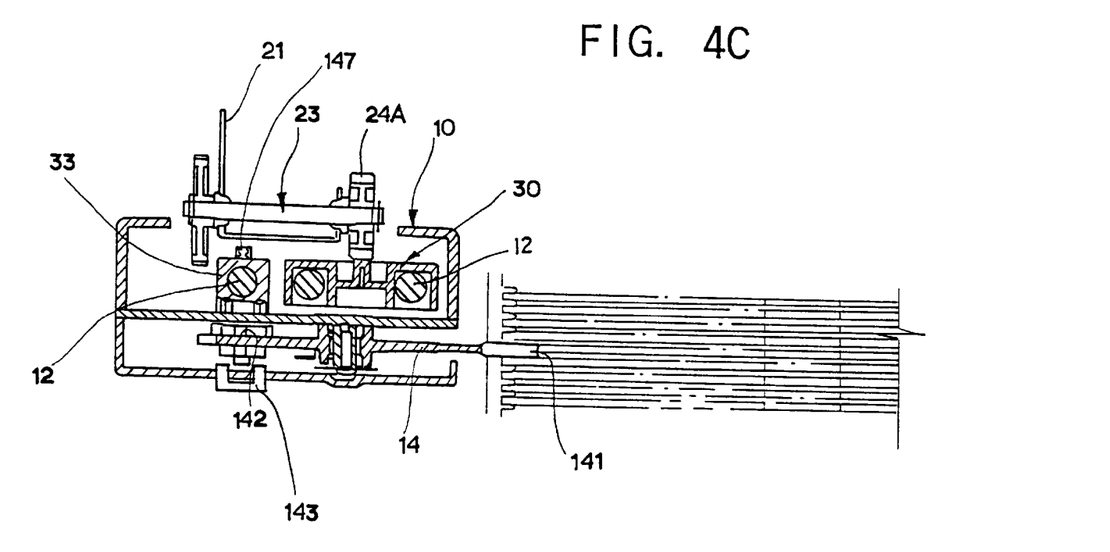
FIG. 4C is a cross-sectional view taken along line C—C of FIG. 3.

FIG. 4C is a cross-sectional view taken along line C—C of FIG. 3. As shown therein, the driving gear assembly 23 having a speed decreasing member is provided.

FIG. 4B is a cross-sectional view taken along line B—B of FIG. 3. As shown therein, the driven gear assembly 24 for increasing the driving force is fixed to the bracket of the transfer member.

In the above-described drawings, there constitutes provided a slider and push levers 14 which is a pushing member.

The slider 30 is inserted into the guide rail 12 passing through the transfer member and includes a rack 32 formed in the upper surface thereof for receiving the driving force from the driving apparatus, with the rack 32 being intermeshed with the gears of the driven gear assembly 24.

Boss 13 is protruded from the bottom portion of the transfer member so that the pushing lever can pivotally move from the bottom portion of the transfer member 10 and is inserted into a hole formed in the center portion of the push levers 14, and rolling bearings 15 arranged in the hole contact with the surface of the boss 13, and a torsion spring 17 is elastically disposed at a periphery of the hole into which the rolling bearings 15 are inserted, so that the push levers 14 elastically contact with the transfer member, and the push levers and the torsion spring 17 is not escaped by a washer 16 when engaging a screw 19.

The push levers 14 are formed to be semi-circular and have a desired contact with the circumferential surface of the compact disk and a circular portion having a guide surface 141. A protrusion 142 is formed in the rear upper surface thereof for receiving a horizontal movement force from the slider 30, and a photo-sensor 143 is disposed below the protrusion 142 for detecting the operation of the push lever 14.

Figure 4D:
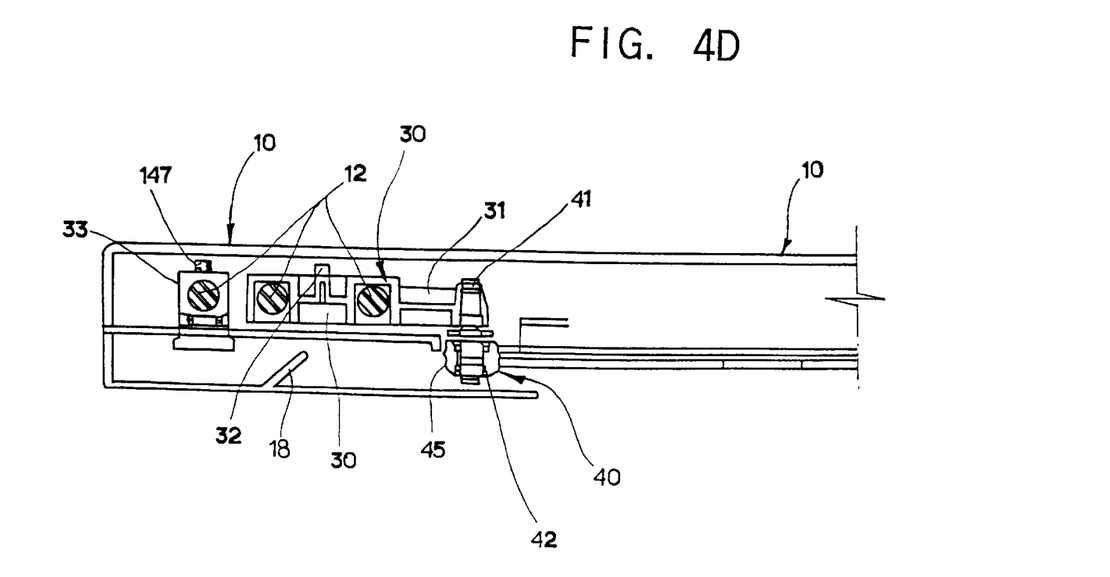
FIG. 4D is a cross-sectional view taken long line D—D of FIG. 3.

FIG. 4D is a cross-sectional view taken along line D—D of FIG. 3.

A triangle-shaped arm fixing member 31 is formed so that the center portion of the slider 30 arranged in the guide rail 12 of the transfer member 10 is formed toward the space between the magazines, and a hinge pin 41 is vertically and downwardly inserted, and the free arm member 40 is engaged to the hinge pin 41.

Figure 5A:
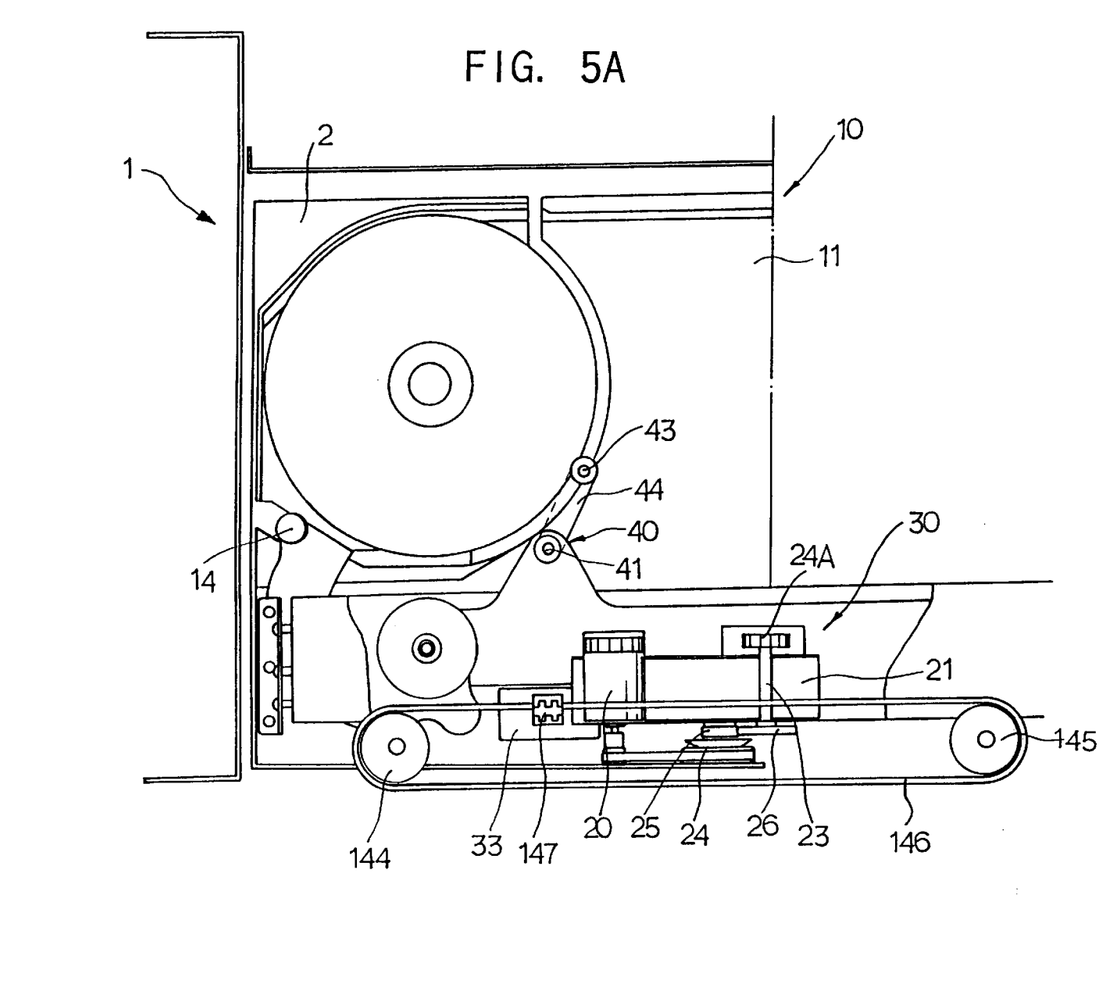
FIG. 5A is a plan view illustrating a compact disk auto-exchanger just before a compact disk is unloaded from a magazine and just after a compact disk is loaded into the magazine.

A pressing portion 33 is formed in the guide rail 12 between the slider 30 and the push lever 14 for pushing the protrusion 142 of the push levers when the slider 30 moves at maximum, and the pressing portion 33, as shown in FIG. 5A, includes a connection portion 147 connected with a timing belt 146 disposed in pulleys 144 and 145, for thus performing a pressing operation.

Figure 5B:
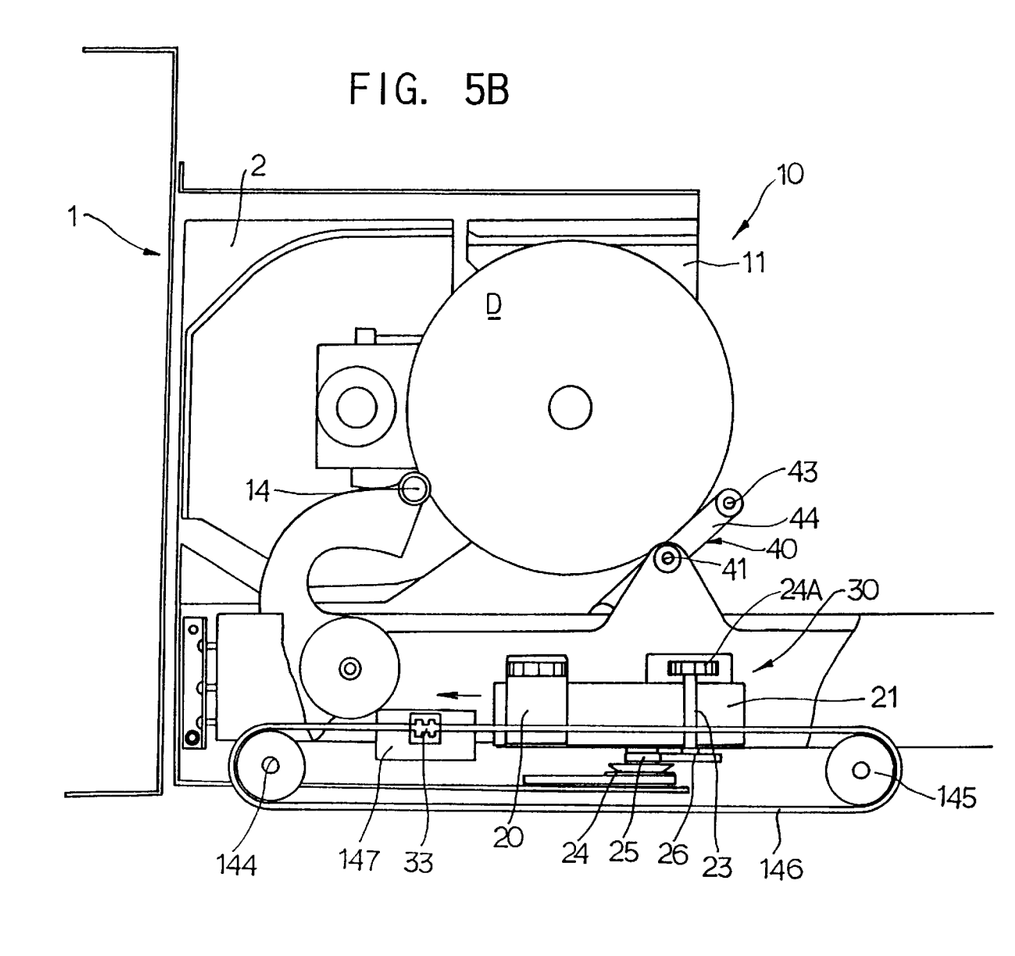
FIG. 5B is a plan view illustrating a compact disk auto-exchanger in order to explain a state that a compact disk is unloaded from a magazine and is moved to a carrier.
Figure 5C:
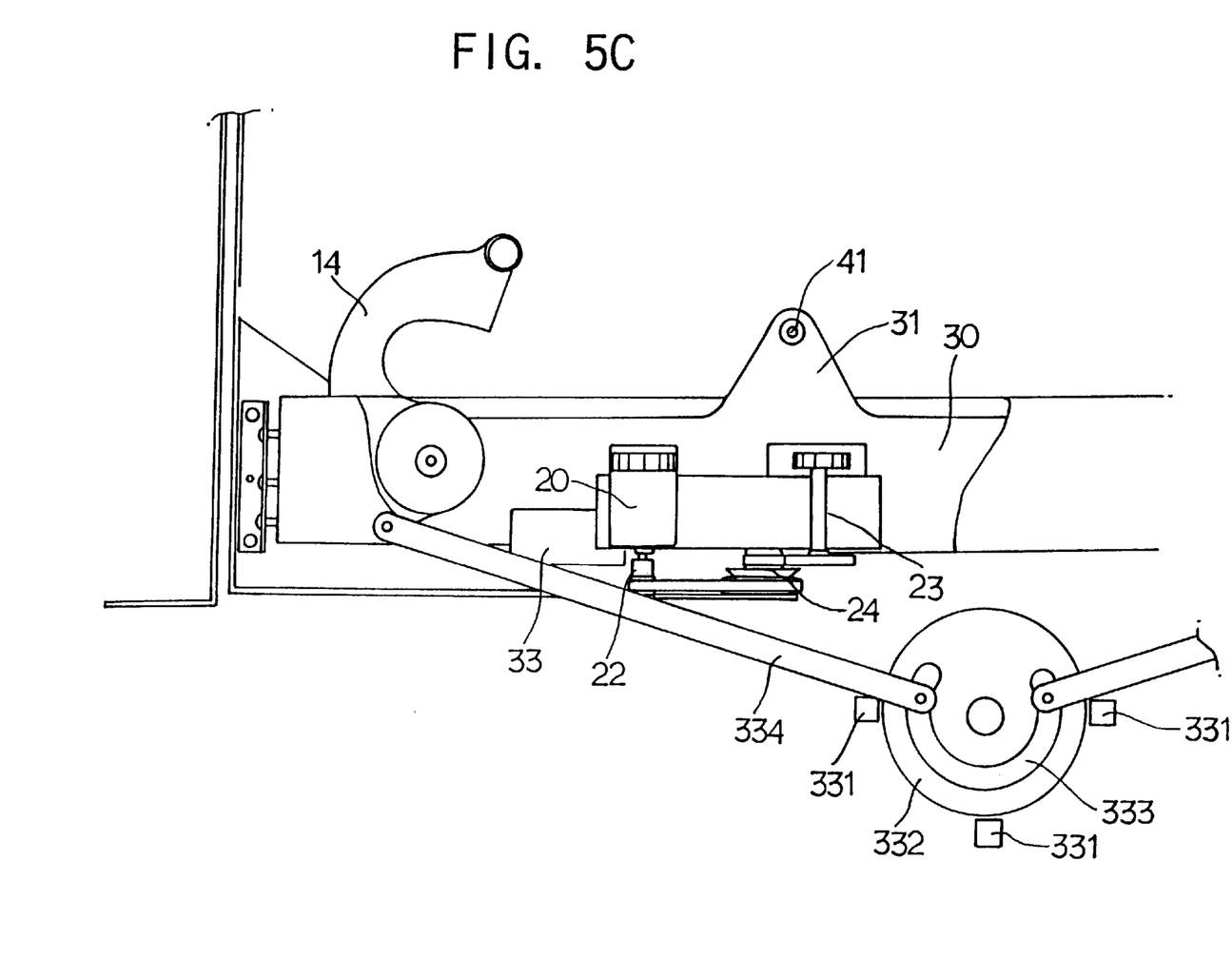
FIG. 5C is a view illustrating a compact disk auto-exchanger according to another embodiment of the present invention.
Figure 6:
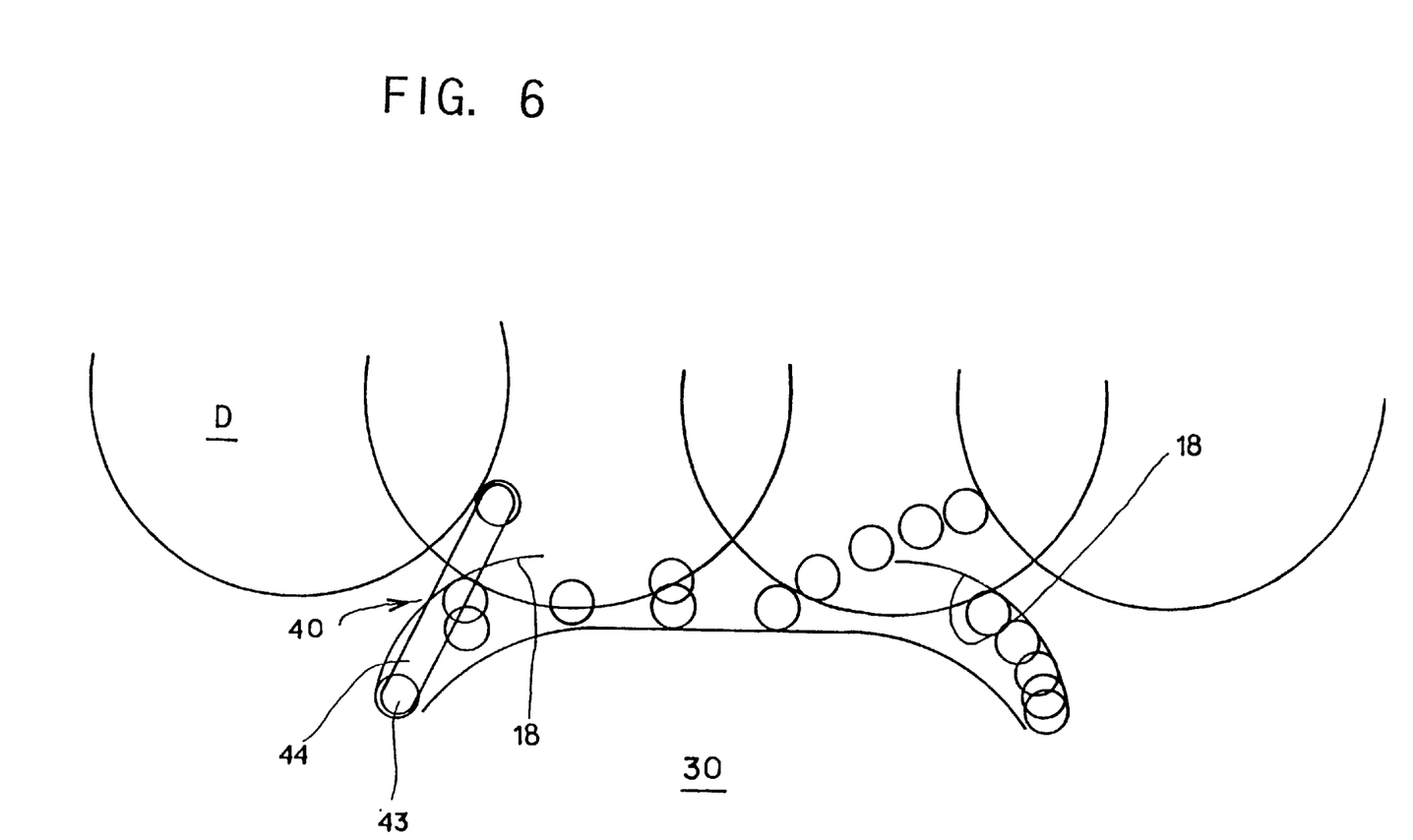
FIG. 6 is a schematic view illustrating a compact disk auto-exchanger in order to explain a state that a free arm member is operated by a guide portion formed in a lower portion of a transfer member according to the present invention.

In the driving member of the push lever 14, as shown in FIG. 5C, a cam groove 333 is formed in a cam 332 which is normally or reversely rotated in accordance with the detection operation of a sensor 331, and an operation lever 334 is disposed in the cam groove 333, one end of which operation lever 334 is connected to one end of the rotation center of the push lever 14, and the push lever 14 is rotated based on the operations of the cam and the operation lever, for thus pushing the compact disk in the magazine.

The rolling bearings 42 are arranged between the hinge pin 41 and the arm 44 so that the free arm member 40 is pivotally moved with respect to the hinge pin 41 disposed in the intermediate portion.

An idler roller 43 is rotatably disposed at both ends of the arm 44 of the free arm member 40, and a concave guide surface 45 is formed in the surface of the idler roller 43 for being contacted with the circumferential surface of the compact disk. In addition, when the free arm member 40 is made horizontal with respect to the transfer member, the compact disk is locked, and when the horizontal state is not made, the compact disk is pushed.

The free arm member 40 is moved in a slanted and horizontal state so as to push the compact disk toward the magazines and the reproduction driving apparatus, and as the idler roller 43 contacts with the guide portion 18 formed in the transfer member 10, the free arm member 40 is freely movable.

The guide portion 18 is bent for a contact with the idler roller 43 and includes a circular bent surface so that the horizontal arm can be rotated in a slanted state.

The guide portion is preferably formed in a portion beyond the center portion of the magazine and in a portion between entrances of the magazines. In addition, the transfer member is cut and forms a curved portion by using the cut portion.

The operation of the compact disk auto-exchanger according to the present invention will now be explained.

First, the unloading operation of the compact disk will now be explained.

In a state that the compact disk is positioned in the magazine or the reproduction driving apparatus, the transfer member 10 is moved to a position of the selected compact disk in accordance with a user's control, and arrives at a predetermined portion, and the vertical movement of the transfer member is finished.

Thereafter, an electrical signal is applied to the driving apparatus 20 of the transfer member, and the driving force is transferred to the driving gear assembly 23 through the pulley 22 of the driving apparatus 20, and the driving force transferred to the driving gear assembly 23 is transferred to the rack 32 of the slider 30.

When the slider 30 moves the compact disk toward the magazine or the reproduction driving apparatus, the idler roller 43 in the side of the free arm member 40 contacts with the guide portion 18 of the transfer member 10 and pivotally moves in a slanted state, and the idler gear which does not contact with the guide portion does not contact with the circumferential surface of the compact disk positioned in the magazine or the reproduction driving apparatus (a first driving state).

Thereafter, the photo-sensor 143 detects the movement and transmits the signal to the controller, and the controller receives the detection signal and judges the current mode as an unloading operation, and the timing belts 146 disposed in the pulleys 144 and 145 are operated by the driving member, and the connection portion 147 of the pressing member 33 connected to the timing belt horizontally moves the pressing member toward the push lever 14, and pushes the protrusion 142 of the push lever 14, so that the push lever 14 is moved in the reverse direction of the moving direction of the free arm member with respect to the boss as the rotation shaft, and the guide surface 141 pushes the lower circular surface of the compact disk D, and the compact disk is unloaded from the magazine or the reproduction driving apparatus, thus causing a rolling operation (a second driving state).

When an electrical signal is applied to the driving apparatus 20, and a signal corresponding to the reverse direction rotation is transmitted, a reverse direction rotation force is generated, so that the slider 30 is returned to the original position through the force transfer system, and the free arm member 40 is horizontally rotated, and the compact disk is unloaded from the magazine.

The compact disk being unloaded from the magazine horizontally pushes the idler roller 43 contacting with the circumferential surface, and the idler roller which escapes from the guide portion 18 contacts with the circumferential surface of the compact disk, and the slider 30 is returned to the original position as shown in FIG. 5B.

Here, when the push lever 14 is rotated at maximum, the pressing member 33 is returned to the original position by the reverse direction rotation force, and the push lever 14 is returned to the original position by the torsion spring 17.

When the slider 30 is returned to the original position, the driving of the driving apparatus is stopped, and the arm of the free arm member maintains a horizontal state, and the idler roller positioned at both ends of the arm contacts with lower portions of the circumferential surface of the compact disk placed on the carrier main body and forms a three contact point (a third driving state).

The above-described first through fourth driving states is the order of unloading the compact disk from the magazine or the reproduction driving mechanism in the housing of the auto-exchanger.

Thereafter, the compact disk moved to the carrier is moved to the magazine or the reproduction driving mechanism (hereinafter termed the receiving state).

When the user selects the receiving state, the transfer member 10 is moved in a predetermined direction by the controller, and the driving apparatus 20 is driven.

The driving force from the driving apparatus is transferred to the slider 30 intermeshed with the driven gear 24A, and the slider 30 is moved to the magazine or the reproduction driving mechanism.

During the movement of the slider 30, the idler roller 43 of the free member 40 contacts with the circular guide portion 18 of the transfer member, and the arm 44 is rotated in a state which is changed from the horizontal state to the slanted state as shown in FIG. 5A.

The rotation force of the free arm member is transferred to the compact disk positioned in the carrier main body 11 through the idler roller 43 as a rolling force.

Therefore, the compact disk rolls in the direction that the driving force is applied and is moved toward the magazine or the reproduction driving mechanism. Here, the pressing member 33 of the slider 30 does not contact with the protrusion of the push lever.

When the movement of the compact disk is finished, the pole of the electric power is changed to the other pole, so that the driving force is changed to reverse rotation direction force, and the slider 30 of the transfer member is moved toward the center portion of the carrier main body, for thus finishing the loading operation.

As described above, in the compact disk auto-exchanger, the slider disposed in the transfer member selectively receives the left or right direction movement force, and the exchange of the compact disks are easily performed from the magazine or the reproduction driving mechanism to the carrier main body and from the carrier main body to the magazine and the reproduction driving mechanism in cooperation with the rotation of the push lever.

In addition, in the embodiment of the present invention, the rotation of the free arm member which pivotally moves is performed by the construction itself formed in the transfer member, and in a state of the horizontal free arm member, the compact disk is locked, and it is possible to more easily exchange the compact disks. Furthermore, since the exchange of the compact disks are performed in limited space, a more compact and lighter product can be made, thus reducing the fabrication cost.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A compact disk auto-exchanging method, comprising the steps of:

vertically moving a transfer member by a separate driving source, said transfer member being disposed between a magazine comprising a plurality of symmetrical storage rooms and a lower portion, and a reproduction driving mechanism disposed in said lower portion of the magazine, said transfer member comprising a pair of end parts and a driving apparatus fixed to the transfer member;

an unloading/loading step in which a push lever disposed at one of said pair of end parts of the transfer member comes into contact with a pressing member, said pressing member moving in a clockwise and counterclockwise direction, by means of torsion springs, with the push lever pushing a peripheral surface of a compact disk for loading and unloading the compact disk to and from the magazine;

a horizontal movement step in which a slider having an arm is moved toward the push lever by a driving force from the driving apparatus fixed to the transfer member, said transfer member moving in a predetermined position in accordance with a control signal; and a fixing release step in which the slider is horizontally moved toward one of said magazine and the reproduction driving mechanism, the arm of the slider contacts with a guide portion of the transfer member in order to rotate from a horizontal state to a slanted state, said arm pushes an idler roller, said idler roller being separated from the compact disk, and said idler roller contacts the peripheral surface of the compact disk by the unloading of the compact disk and the returning of the slider toward the opposite direction of the push lever.

2. A compact disk auto-exchanger comprising a plurality of magazines, said magazines comprising a plurality of storage rooms and a lowest storage room, wherein a reproduction driving apparatus is disposed in a bottom surface of the lowest storage room, said auto-exchanger comprising a transfer member being vertically moved in a space formed between the magazines, and a compact disk arranged in a first predetermined position is moved by a rolling method, the compact disk comprising a peripheral surface, the auto-exchanger further comprising:

the transfer member comprising a plurality of push levers which is provided on the transfer member disposed in each front portion of the magazines, one of said plurality of push levers comprising a protrusion between the push levers, said push levers for unloading the compact disk in a predetermined direction and an arm disposed between the push levers for loading the compact disk into a predetermined storage room, with the arm being movable in the left and right directions, which is positioned on a rear-upper part, said transfer member having a guide rail;

a driving apparatus disposed in a bracket of the transfer member for generating a normal and reverse direction driving force and for transferring the compact disk to a second predetermined position;

a slider comprising a carrier main body which is provided on the transfer member and said arm, said carrier main body moved by the driving force from the driving apparatus in a state that the slider is horizontally moved in the transfer member and is inserted into the guide rail, and a pressing member which is contacted by the protrusion, said protrusion moving along a timing belt and when the horizontal movement is finished, an idler roller for selectively supporting the peripheral surface of the compact disk being disposed at both ends of said arm; and a guide portion comprising a circular portion in which the slider is rotated in a slanted state so that said arm moves the compact disk.

3. The auto-exchanger of claim 2, wherein said transfer member comprises:

the guide rail, the guide rail being disposed in an upper space of the transfer member by partitioning an intermediate portion thereof;

the slider, the slider comprising the arm disposed between the push levers for loading and being inserted into the guide rail, with the slider being horizontally movable;

a roller bearing arranged in a hole of at least one of said push levers; a boss inserted into the at least one of said push levers; said bearing and said boss contacting each other in the at least one of said push levers, said at least one of said push levers sliding on said roller bearing; and the guide portion, the guide portion being rotatable in a slanted state with respect to said arm disposed between the push levers for loading and being disposed in a lower portion of the transfer member.

4. The auto-exchanger of claim 2, wherein the driving apparatus is disposed in an upper surface of the transfer member for generating the normal and reverse driving forces, the driving apparatus including a gear assembly, and a rack protruding from the upper surface of the slider for enabling the gear assembly and the rack to be intermeshed with each other.

5. The auto-exchanger of claim 2, wherein the guide portion is formed in the tranfer member and is formed to be slanted toward the push levers at the entrance of the magazines.

6. The auto-exchanger of claim 2, wherein said arm is disposed in an arm fixing member of the slider and has a width smaller than the diameter of the compact disk, said arm contacting with a first and second point on the compact disk, in a state that the idler roller disposed at both ends of the arm is blocked by the slider.

7. The auto-exchanger of claim 2, wherein a driving means of the push levers comprises:

a cam groove formed to rotate in a clockwise and counterclockwise direction in response to the operation of a sensor formed in a reversible cam in accordance with the detection operation of the sensor;

an operation lever disposed in the cam groove, one end of said operation lever connected to a rotation center of at least one of the push levers, wherein as the push levers are rotated in accordance with the operations of the cam and the operation lever, the push levers push the compact disk.

8. A compact disk auto-exchanging method, comprising the steps of:

vertically moving a transfer member by a separate driving source, said transfer member being disposed between a magazine comprising a plurality of symmetrical storage rooms and a lower portion, and a reproduction driving mechanism disposed in said lower portion of the magazine, said transfer member comprising a pair of end parts and a driving apparatus fixed to the transfer member;

an unloading/loading step in which a push lever disposed at said pair of end parts of the transfer member comes into contact with a pressing member, said pressing member moving in a clockwise and counterclockwise direction, by means of torsion springs, with the push lever pushing a peripheral surface of a compact disk for loading and unloading the compact disk to and from the magazine;

a pushing step, in which a first end of an operation lever is linked to a pushing lever and a second end is linked to a cam groove of a cam by a pressing portion fixed onto a timing belt which is driven by the driving apparatus;

a pulling step in which the pushing lever is pushed against one of said torsion springs by said operation lever, said pushing lever in rotated in order to push the compact disk from one of the storage rooms onto the transfer member;

a transferring step, in which said compact disk is transferred onto the transfer member along a guide portion of the transfer member;

a horizontal movement step in which a slider having an arm, said arm having an idler roller contacting said transfer member, is moved toward the push lever by a driving force from the driving apparatus fixed to the transfer member, said transfer member moving in a predetermined position in accordance with a control signal; and a fixing release step in which the slider is horizontally moved toward one of said magazine and the reproduction driving mechanism, the arm of the slider contacts with a guide portion of the transfer member in order to rotate from a horizontal state to a slanted state, said arm pushes the idler roller, said idler roller being separated from the compact disk, and said idler roller contacts the peripheral surface of the compact disk by the unloading of the compact disk and the returning of the slider toward the opposite direction of the push lever.

* * * * *